United States Patent

Talalay

[15] 3,689,613
[45] Sept. 5, 1972

[54] GLOVE MAKING
[72] Inventor: Anselm Talalay, 2867 Ludlow Road, Cleveland, Ohio 44120
[22] Filed: Nov. 2, 1970
[21] Appl. No.: 85,839

[52] U.S. Cl. ...................264/83, 264/306, 264/307
[51] Int. Cl. ................................................B29h 3/04
[58] Field of Search ......264/83, 307; 2/168; 264/306

[56] References Cited

UNITED STATES PATENTS

| | | | |
|---|---|---|---|
| 3,013,302 | 12/1961 | Croxton | 264/303 |
| 3,397,265 | 7/1968 | Ansell | 264/306 |
| 1,881,742 | 10/1932 | Lilienfeld | 264/83 |
| 2,064,143 | 12/1936 | Belton et al. | 264/83 |

Primary Examiner—Robert F. White
Assistant Examiner—J. R. Hall
Attorney—Joseph Januszkiewicz and W. A. Shira, Jr.

[57] ABSTRACT

A process for manufacturing latex gloves which includes coating a form with coagulant solution, thence coating the coagulant dipped form with latex followed by exposing the latex dipped form to carbon dioxide to harden the deposit thereon, thence washing such coated form, and thence curing such deposit on such form.

4 Claims, 1 Drawing Figure

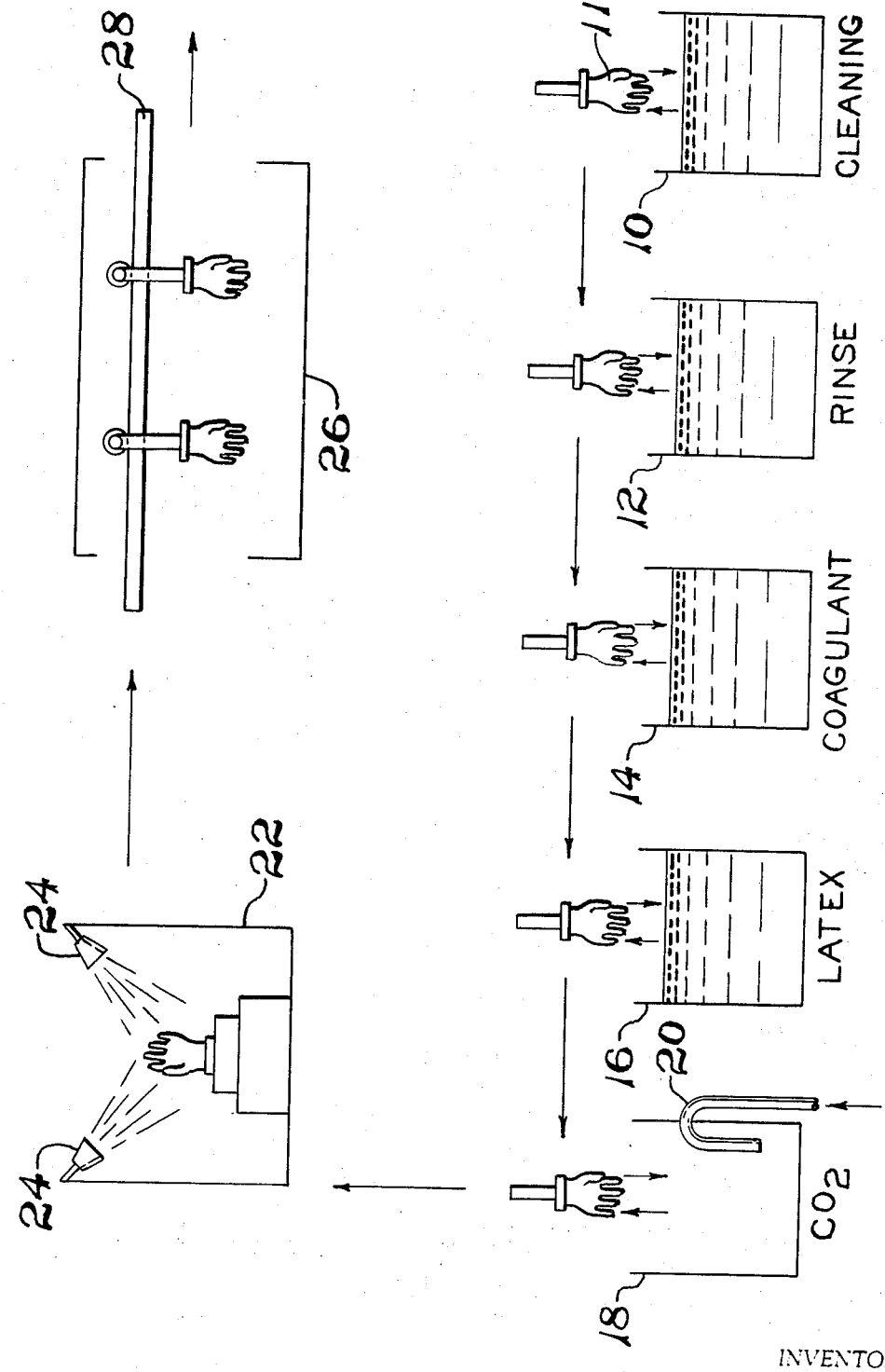

GLOVE MAKING

BACKGROUND OF THE INVENTION

This invention relates to a process for making latex gloves and more particularly to an improved method for dip coating glove forms into an aqueous dispersion of rubber and rubber-like materials and more rapidly processing such coated glove forms into a finished product.

In the manufacture of latex gloves, the one general method that is widely accepted as producing quality gloves is to dip a prewashed and preheated porcelain glove form into a coagulant solution which may be an alcohol solution of calcium and zinc nitrates, after which such coagulant coated form is dried. Thereafter, such coated form is dipped into a rubber latex solution. After such latex dipped glove form is removed from the solution, it is dried and thence placed in a curing oven wherein such glove is vulcanized.

The present invention provides means for expediting the manufacture of such latex dipped gloves by accelerating the process and improving the quality of the glove form.

The process of this invention is particularly useful for making surgeons' gloves wherein the final thin layer of latex is a smooth even layer of consistent quality material.

BRIEF DESCRIPTION OF THE DRAWING

The single FIGURE is a diagrammatic view of the general layout of the means for making latex rubber gloves.

DETAILED DESCRIPTION

Referring to the drawing, there is shown a tank 10 that contains a solution or liquid for cleaning a glove form such as a porcelain glove form 11. The cleaning of the glove form 11 in such tank may be an ultrasonic cleaning followed by a rinsing of the form 11 in tank 12 to assure a thoroughly clean glove form.

The glove form 11 is thence moved above a tank 14 containing a solution of calcium or zinc nitrate in alcohol which is a coagulant. Suitable temperature control means are provided to maintain the solution at approximately 105° F. in the example chosen. Located adjacent to the tank 14 is a tank 16 containing a rubber latex dispersion having a total solid contents by weight of 30percent. Suitable temperature control means are provided for tank 16 to maintain the dispersion at a temperature of 75° F. Adjacent to tank 16 is a tank 18 that contains an atmosphere of a coagulating acid gas such as carbon dioxide or sulphur dioxide. A conduit 20 extending downwardly into tank 18 is connected to a suitable source of carbon dioxide supply which supplies the gas thereto to maintain a carbon dioxide air mixture. Such atmosphere will be referred to as an air-carbon dioxide mixture. Shown as located above tank 18 is a tank 22 which contains spray head 24 for directing a water spray onto glove forms positioned therein. Such tank 16 may be located adjacent thereto to maintain a smooth flow path to the process. Located adjacent to tank 22 is an oven, designated as 26 which contains a rail 28 upon which glove forms may be suitably mounted for movement through such oven 26. Suitable heat control means are provided for oven 26 to maintain the temperature thereof to cure or vulcanize the latex on the glove forms passing through such oven 26.

The preferred method of making gloves according to the invention disclosed herein is to clean the porcelain glove form as by use of an ultrasonic means, thence rinse the form in tank 12 in preparation for coating the form. The cleaned glove form 11 is then dipped into the alcohol solution of calcium nitrate contained in tank 14 to provide a thin coating of coagulant thereon. The glove form is removed from tank 14 and dried at room temperature briefly prior to immersing the coagulated coated glove form into the aqueous dispersion of latex in tank 16. The latex coated glove form, while still moist, is then exposed to an atmosphere of coagulating acid gas such as carbon dioxide or air-carbon dioxide mixture to further coagulate the outer surface of the latex deposit on the glove form which action hardens the outer surface in preparation for the leaching or washing operation that is to follow. On removal of the glove form from the tank 18, the glove form is thence placed into spray tank 22 wherein the glove form is washed. The coagulant used on the forms has a reaction with the rubber latex which provides a salt product which must be thoroughly leached out of the glove in order to prevent irritation to the surgeons' hands.

Leaching is accomplished with a very light spray of water; however, with the outside of the latex coat being firmly gelled by the action of the carbon dioxide atmosphere or air-carbon dioxide mixture on the latex, a more copious water supply may be applied sooner than heretofore possible to obtain a fast leaching action and thereby speed up the process. The latex glove form is then passed through oven 26 where the latex is cured to form the finished product. The process was described with respect to air-carbon dioxide mixture; however, in lieu thereof an air-sulphur dioxide mixture is also encompassed.

Although the process for manufacturing the gloves has been described with respect to a single glove form it is to be understood that the process is adapted to the processing of a plurality of glove forms simultaneously without departing from the scope of the invention.

I claim:

1. The method of making a latex rubber article comprising the steps of immersing a form into a latex coagulant solution; removing the form from the coagulant solution and leaving a latex coagulant coating on said form; immersing said coagulant coated form into a solution of latex; thence removing the coagulant coated form from the latex solution and leaving a coating of latex on said latex coagulant coated form with a coagulating action taking place in said latex coating progressing from the inner surface of said latex coating toward the outer surface; exposing the moist outer surface of said latex coating form to an atmosphere of latex coagulating acid gas; leaching out the salt product of said coagulating action; vulcanizing said latex coating on said form to a cured rubber article; and removing said cured rubber article from said form.

2. The method of making a latex rubber article as set forth in claim 1, wherein said exposing of the moist outer surface of said latex coating is to an atmosphere of carbon dioxide gas.

3. The method of making a latex rubber glove, comprising the steps of dipping a glove form into a latex rubber coagulant solution to deposit a coating of said coagulant upon said form, dipping said solution coated glove form into liquid latex rubber to deposit a coating of said latex upon said coagulant coated glove form and to cause a coagulating action on said latex coating progressing from the inner surface outwardly into said latex coating; exposing said moist latex coating outer surface to an atmosphere of coagulating acid gas to provide a coagulating action on said latex coating that progresses from the outer surface into said latex coating; washing said latex coating on said glove form to remove the salt product of the coagulating action, vulcanizing said latex coating on said glove form to form a cured rubber glove; and removing said cured rubber glove from said glove form.

4. The method of making a latex rubber glove as set forth in claim 3, wherein said exposing of said moist latex coated glove form to a coagulating acid gas is to an atmosphere of carbon dioxide gas.

* * * * *